(12) United States Patent
Xu

(10) Patent No.: US 9,229,242 B2
(45) Date of Patent: Jan. 5, 2016

(54) 3D DISPLAY DEVICE, 3D DISPLAY SYSTEM AND METHOD FOR DISPLAYING 3D IMAGES

(71) Applicant: NVIDIA Corporation, Santa Clara, CA (US)

(72) Inventor: Shuang Xu, Shenzhen (CN)

(73) Assignee: NVIDIA Corporation, Santa Clara, CA (US)

(*) Notice: Subject to any disclaimer, the term of this patent is extended or adjusted under 35 U.S.C. 154(b) by 488 days.

(21) Appl. No.: 13/667,442

(22) Filed: Nov. 2, 2012

(65) Prior Publication Data

US 2014/0043446 A1  Feb. 13, 2014

(30) Foreign Application Priority Data

Aug. 13, 2012  (CN) .......................... 2012 1 0287741

(51) Int. Cl.
*H04N 13/04* (2006.01)
*G02B 27/22* (2006.01)

(52) U.S. Cl.
CPC ........ *G02B 27/2264* (2013.01); *H04N 13/0438* (2013.01); *H04N 13/0497* (2013.01)

(58) Field of Classification Search
CPC .................................................. G01B 11/2513
USPC .......................................................... 348/51
IPC ...................................................... H04N 13/04
See application file for complete search history.

(56) References Cited

U.S. PATENT DOCUMENTS

| 8,970,682 | B2 | 3/2015 | Kim et al. | |
| 2004/0086005 | A1* | 5/2004 | Kitaoka et al. | 372/25 |
| 2010/0188440 | A1* | 7/2010 | Chen et al. | 345/690 |
| 2011/0157260 | A1 | 6/2011 | Pyun et al. | |
| 2011/0157332 | A1* | 6/2011 | Kim et al. | 348/56 |
| 2011/0164194 | A1* | 7/2011 | Robinson et al. | 349/15 |
| 2011/0305443 | A1* | 12/2011 | Sasaki et al. | 386/357 |
| 2012/0127212 | A1* | 5/2012 | Lin et al. | 345/690 |

FOREIGN PATENT DOCUMENTS

| CN | 1501358A | A | 6/2004 |
| CN | 101909220 | A | 12/2010 |
| CN | 102111627 | A | 6/2011 |

(Continued)

OTHER PUBLICATIONS

Office Action from Chinese Application No. 201210287741.3, dated Dec. 24, 2014.

(Continued)

*Primary Examiner* — Jay Patel
*Assistant Examiner* — Yulin Sun
(74) *Attorney, Agent, or Firm* — Zilka-Kotab, PC

(57) ABSTRACT

3D display device, 3D display system and method for displaying 3D images are disclosed in the present invention. The 3D display device comprises: a display screen; a backlight means including a pulse light source; and a drive means used to receive video signals which are based on a standard video transmission protocol, so as to control the display screen to display 3D images according to the video signals, and control the pulse light source to emit a backlight pulse in the form of pulse during a vertical blank of each frame period of the video signals, wherein the duration of the backlight pulse is shorter than that of the vertical blank. The degrading of light is avoided in the 3D display device and the efficiency of the backlight can achieve almost 100%.

21 Claims, 4 Drawing Sheets

(56) References Cited

FOREIGN PATENT DOCUMENTS

| CN | 102117608 A | 7/2011 |
|---|---|---|
| CN | 102334338A A | 1/2012 |

OTHER PUBLICATIONS

Office Action from Chinese Application No. 201210287741.3, dated Jun. 25, 2015.

* cited by examiner

3D DISPLAY DEVICE, 3D DISPLAY SYSTEM AND METHOD FOR DISPLAYING 3D IMAGES

CROSS-REFERENCE TO RELATED APPLICATIONS

This application claims priority to Chinese Patent Application No. 201210287741.3, filed on Aug. 13, 2012, which is hereby incorporated by reference in its entirety.

FIELD OF INVENTION

The present invention relates generally to the art of 3D display, in particular, to 3D display device, 3D display system and method for displaying 3D images.

BACKGROUND

Ordinary 2D display system mainly comprises a display device and a control means connected to the display device (e.g. the host of a computer, cell phone, etc.). The drive means in the display device (e.g. the graphic card) receives video signals from the control means, and control image-displaying on the display screen of the display device according to the video signals. A standard video transmission protocol is used between the control means and the drive means in the display device. In the video signals based on a standard video transmission protocol from the control means, the vertical blank of each frame period constitutes a pretty short portion of each frame period, e.g. the vertical blank of each frame period constitutes 1%-2% of each frame period in the case of video signals based on a standard DVI (Digital Video Interface) protocol.

Like the 2D display system, a 3D display system also comprises a display device and a control means connected to the display device. And the drive means in the display device (e.g. the graphic card) receives video signals from the control means, and control image-displaying on the display screen of the display device according to the video signals. The difference is that images for left eye are different from the images for right eye in the principle of the 3D display system, what left eye sees are images corresponding to the left eye, and what right eye sees are images corresponding to the right eye, so that the 3D display system also comprise 3D glasses which are controlled. Specifically, two sets of images, one set for left eye and one set for right eye are actually displayed on the display device. Each of frame period in the video signals corresponds to image for left eye and image for right eye in turn. Correspondingly, images for left eye and images for right eye appear on the display screen in turn. When showing one frame of image for one eye, the other eye which is not supposed to see that frame of image is blocked by controlling the 3D glasses.

In addition, each frame of image is seen by one eye, but during the scan stage of that frame image (the transmission stage of the image), the image should not be seen by the eye. Only in the stage when the scan of the image is completed (the vertical blank stage) should light be passed (i.e. light are allowed to enter the eye). And the level of feeling about the frame of image that the eye experiences is the integral of brightness of the image and time of feeling. So that in the present art of 3D display, both lenses of the 3D glasses are blocked via control (in general the lenses are turned to black by switching on current). The vertical blank of each frame of video signals constitutes a longer portion of each frame period, in order to ensure that the viewers see the video images with enough brightness and clarity. However, the duration of the vertical blank of each frame of video signals cannot be extended without limitation as the phenomenon of ghosting has to be avoid. Furthermore, the backlight of the backlight means in the 3D display device is continuously in a state of being turned on.

For example, when the video signals are based on a DVI protocol, the vertical blank constitutes at most 32% of each frame of video signals, otherwise there will be a problem of ghosting in the present art, as shown in FIG. 1. Also, corresponding to each frame of video signals, only one of the lenses of the 3D glasses is pervious to light during the vertical blank of that frame of video signal. In FIG. 1, in the coordinate of video signals, '1' represents that the frame of video signals is being transmitted while '0' represents that the transmission of the frame of video signals is completed, i.e. the vertical blank. In the coordinate of the state of lenses, '0' represents that both of the lenses are blocked, '1' represents that the left lens is pervious to light and '−1' represents that the right lens is pervious to light. The backlight of the backlight means is continuously in a state of being turned on.

Thus, only a portion of the brightness (corresponding to the vertical blank) provided by the backlight means enters the eyes of the viewer(s). Besides, longer vertical blanks constitute a larger portion of bandwidth of digital link of the video signals. And the longer vertical blanks also demand anon-standard video transmission protocol between the control means and the drive means. So that the ordinary drive means has to be altered (i.e. a non-standard drive means is used). However, the non-standard drive means is non beneficial for further update of the product.

Therefore, there is a need of providing a 3D display device, a 3D display system and a method for displaying 3D image to solve the above problems.

SUMMARY OF THE INVENTION

In order to solve the above-mentioned problems, according to one aspect of the present invention, a 3D display device is provided which comprises: a display screen; a backlight means including a pulse light source; and a drive means used to receive video signals which are based on a standard video transmission protocol, so as to control the display screen to display 3D images according to the video signals, and control the pulse light source to emit a backlight pulse in the form of pulse during a vertical blank of each frame period of the video signals, wherein the duration of the backlight pulse is shorter than that of the vertical blank.

Preferably, the peak power of the backlight pulse is greater than 100 W.

Preferably, the peak power of the backlight pulse is 2 KW.

Preferably, the video signals are based on a standard DVI protocol, with the vertical blank of each frame period thereof constituting 1%-2% of each frame period; or the video signals are based on a standard HDMI protocol, with the vertical blank of each frame period thereof constituting 1%-2% of each frame period; or the video signals are based on a standard DP protocol, with the vertical blank of each frame period thereof constituting 1%-2% of each frame period.

Preferably, the pulse light source is a pulse-LED or a semiconductor laser.

Preferably, the transmission rate of the video signals is greater than 120 frames/s.

Preferably, the backlight pulse has two types, a first backlight pulse and a second backlight pulse, which are emitted alternately.

Preferably, the first backlight pulse includes a first pulse and a second pulse emitted in sequence; the second backlight pulse includes a third pulse and a fourth pulse emitted in sequence; wherein the first pulse is shorter than the second pulse, and the third pulse is longer than the fourth pulse; or the first pulse is longer than the second pulse, and the third pulse is shorter than the fourth pulse.

According to another aspect of the present invention, a 3D display system is provided which comprises: a control means which outputs video signals based on a standard video transmission protocol; a 3D display device which comprises a display screen; a backlight means including a pulse light source; and a drive means connected to the control means to receive the video signals, so as to control the display screen to display 3D images according to the video signals, and control the pulse light source to emit a backlight pulse in the form of pulse during a vertical blank of each frame period of the video signals, wherein the duration of the backlight pulse is shorter than that of the vertical blank; and 3D glasses which are connected to the control means in a wired or wireless manner, so as to block two lenses thereof alternately in equal block periods according to the video signals, wherein each of the block periods corresponds to each frame period of the video signals.

Preferably, the peak power of the backlight pulse is greater than 100 W.

Preferably, the peak power of the backlight pulse is 2 KW.

Preferably, the video signals are based on a standard DVI protocol, with the vertical blank of each frame period thereof constituting 1%-2% of each frame period; or the video signals are based on a standard HDMI protocol, with the vertical blank of each frame period thereof constituting 1%-2% of each frame period; or the video signals are based on a standard DP protocol, with the vertical blank of each frame period thereof constituting 1%-2% of each frame period.

Preferably, the pulse light source is a pulse-LED or a semiconductor laser.

Preferably, the transmission rate of the video signals is greater than 120 frames/s.

Preferably, the backlight pulse has two types, a first backlight pulse and a second backlight pulse, which are emitted alternately; the 3D glasses block one of the two lenses thereof according to the finish of the first backlight pulse, and block the other one of the two lenses thereof according to the finish of the second backlight pulse.

Preferably, the first backlight pulse includes a first pulse and a second pulse emitted in sequence; the second backlight pulse includes a third pulse and a fourth pulse emitted in sequence; wherein the first pulse is shorter than the second pulse, and the third pulse is longer than the fourth pulse; or the first pulse is longer than the second pulse, and the third pulse is shorter than the fourth pulse.

According to yet another aspect of the present invention, a method for displaying 3D images is provided which comprises the steps of: receiving video signals which are based on a standard video transmission protocol; displaying 3D images according to the video signals, and emitting a backlight pulse in the form of pulse during a vertical blank of each frame period of the video signals, wherein the duration of the backlight pulse is shorter than that of the vertical blank.

Preferably, the peak power of the backlight pulse is greater than 100 W.

Preferably, the peak power of the backlight pulse is 2 KW.

Preferably, the backlight pulse has two types, a first backlight pulse and a second backlight pulse, which are emitted alternately.

Following are the effectiveness of the present invention:

In the present 3D display device, the drive means receives video signals which are based on a standard video transmission protocol, so as to control the display screen to display 3D images according to the video signals, and control the pulse light source to emit a backlight pulse in the form of pulse during the vertical blank of each frame period of the video signals, and the duration of the backlight pulse is shorter than that of the vertical blank. It will be understand by people skilled in the art that the power of the above mentioned backlight pulse should be much higher than that of the ordinary continuous backlight.

It will be understand that all of the light corresponding to each frame of the video signals from the display device will enter one of the lenses of the viewer's glasses, so that the degrading of light is avoided. Besides, the images on the display screen is seen by the viewers only during the time when the backlight is being emitted, which causes the vertical blank of the video signals can only constitute a pretty small bandwidth of the digital link of the video signals, so that the drive means can receive video signals which are based on a standard video transmission protocol, so as to control the displaying of 3D images. Thus, the standard drive means can be used, which is beneficial for further update of the drive means.

A serial of simplified conceptions are incorporated into the summary of the invention, which will be further described in more detail in the detailed description. The summary of the invention neither implies that it is intended to limit the essential features and necessary technical features of the technical solution to be protected, nor implies that it is intended to define the protection scope of the technical solution to be protected.

Advantages and features of the present invention will be described in detail below in connection with the accompanying drawings.

BRIEF DESCRIPTION OF THE DRAWINGS

The following drawings of the present invention as a part of the present invention herein are used for understanding of the present invention, the implementations and the descriptions thereof are illustrated in the drawings for explaining the principle of the present invention. In the drawings.

DETAILED DESCRIPTION

A plenty of specific details are presented so as to provide more thoroughly understanding of the present invention in the description below. However, the present invention may be implemented without one or more of these details, as is obvious to those skilled in the art. In other examples, some of the technical features known in the art are not described so as to avoid confusions with the present invention.

Detailed structures will be presented in the following description for more thoroughly appreciation of the invention. Obviously, the implementation of the invention is not limited to the special details well-known by those skilled in the art. Preferred embodiments are described as following, however, the invention could also comprise other ways of implementations.

Figure 1:
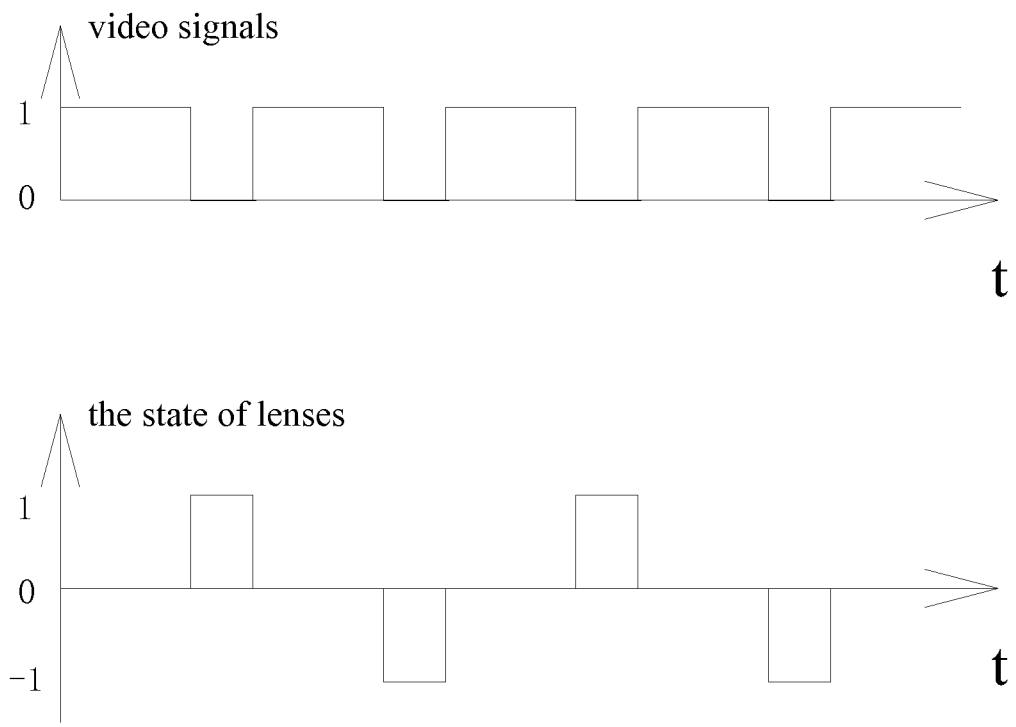
FIG. 1 illustrates a timing diagram of the video signals and the state of lenses of the 3D glasses in the present art of 3D display.
Figure 2:
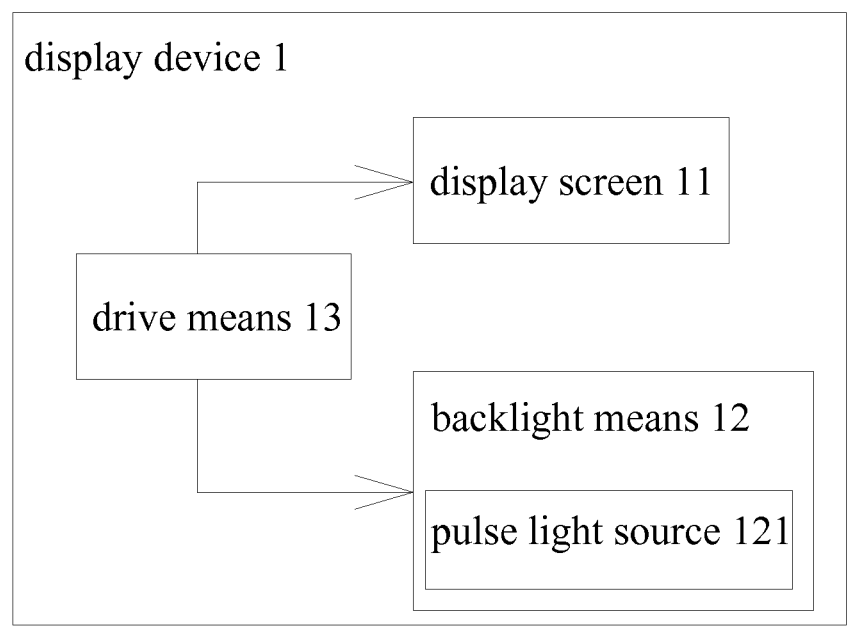
FIG. 2 illustrates a schematic component view of the 3D display device in accordance with the embodiment of the present invention.
Figure 3:
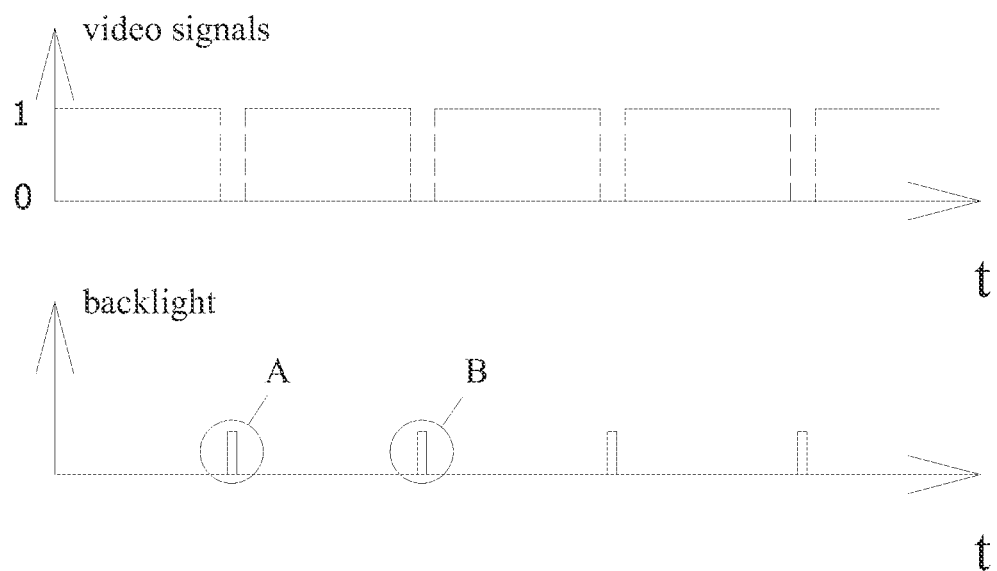
FIG. 3 illustrates a timing diagram of the video signals received and backlight emitted by the 3D display device in accordance with the embodiment of the present invention.

As shown in FIG. 2, the 3D display device in accordance with the embodiment of the present invention comprises a display screen 11, a backlight means 12 and a drive means 13. The backlight means 12 includes a pulse light source 121. The drive means 13 is used to receive video signals which are based on a standard video transmission protocol as shown in FIG. 3, so as to control the display screen 11 to display 3D images according to the video signals, and control the pulse light source to emit a backlight pulse in the form of pulse as shown in FIG. 3 during the vertical blank of each frame period of the video signal. Wherein the duration of the backlight pulse is shorter than that of the vertical blank. In FIG. 3, in the coordinate of video signals, '1' represents that the frame of video signals is being transmitted while '0' represents that the transmission of the frame of video signals is completed, i.e. the vertical blank. It will be understand by people skilled in the art that since the level of feeling about the image that the eye experiences is the integral of brightness of the image and time of feeling, the power of the above mentioned backlight pulse should be much higher than that of the ordinary continuous backlight.

It will be understand that all of the light corresponding to each frame of the video signals from the display device 1 will enter the respective one of the lenses of the viewer's glasses, so that the degrading of light is avoided. Besides, since backlight is the most power consuming source in a display device, and in the 3D display device of the present invention, the backlight means 12 doesn't emit any light during the transmission stage of each frame of video signals, so that the backlight pulse can entirely enter the respective lens of the 3D glasses and there isn't any waste of energy. That is, the efficiency of the emitted backlight can achieve almost 100%.

Besides, the images on the display screen is seen by the viewers only during the pretty short time when the backlight is being emitted, which causes the vertical blank of the video signals can only constitute a pretty small bandwidth of the digital link of the video signals (as shown in FIG. 3), so that the drive means 13 can receive video signals which are based on a standard video transmission protocol (the vertical blank of which is pretty short), so as to control the displaying of 3D images. Thus, the standard drive means can be used, which is beneficial for further update of the drive means.

Furthermore, in the 3D display device of the present art, the backlight means is continuously in a state of being turned on, which causes that both of the lenses of the connected 3D glasses are required to be blocked during the transmission stage of the image. And during the vertical blank, the corresponding lens is better synchronously turned to be pervious to light. Apparently, the 3D display device demands a very high control precision of synchronization of the 3D glasses connected thereto. However, in the 3D display device of the present invention, the light source in the backlight means 12 is the pulse light source 121 which only emits one backlight pulse corresponding to the vertical blank of each frame of video signals. The display screen 11 doesn't emit light except in the time of the backlight pulse. Thus, it is not necessary for both lenses of the 3D glasses connected to the 3D display device to be blocked during the transmission stage of each frame of image. That is, for the 3D display device 1 of the present invention, it is only required that the two lenses of the 3D glasses connected thereto are blocked alternately (pervious to light alternately), with each lens experiences one backlight pulse during the period in which it is pervious to light. Thus the demand for the control precision of synchronization of the 3D glasses used together with the 3D display device is decreased in the 3D display device of the present invention.

Furthermore, the peak power of the backlight pulse is preferably greater than 100 W such that normal and clear images are seen by viewers. The peak power of the backlight pulse is more preferably 2 KW or even more than 2 KW.

Preferably, the video signals received by the drive means 13 are based on a standard DVI protocol, or based on a standard HDMI (High Definition Multimedia Interface) protocol, or based on a standard DP (Display Port) protocol. The vertical blank of each frame period of the video signals based on a standard DVI protocol constitutes 1%-2% of each frame period of the video signals. The vertical blank of each frame period of the video signals based on a HDMI protocol constitutes 1%-2% of each frame period of the video signals. The vertical blank of each frame period of the video signals based on a DP protocol constitutes 1%-2% of each frame period of the video signals.

The pulse light source 121 could be any light source that can emit light with high power (e.g. an average power of more than 100 W and a peak power of more than 1000 W) and can bear the emission of pulse light. Preferably, the pulse light source 121 could be a pulse-LED, or preferably, the pulse light source 121 could also be a semiconductor laser.

Moreover, preferably, the transmission rate of the video signals received by the drive means 13 could be greater than 120 frames/s, so that for a pair of 3D glasses connected to the 3D display device, each of the lenses receive images at a rate of more than 60 frames/s, to ensure that the eyes of the viewer(s) won't feel any blinking.

The backlight pulses emitted by the pulse light source 121 of the backlight means 12 could be uniform. Preferably, in the present invention the backlight pulse has two types, a first backlight pulse and a second backlight pulse, which are emitted alternately. Thus, the 3D glasses used in connection with the 3D display device may control the state of being pervious/blocked of the two lenses in accordance with the first backlight pulse and the second backlight pulses. While in the present art, e.g. an infrared synchronization emitter and an infrared synchronization receiver are used to control the state of the 3D glasses.

Figure 4:
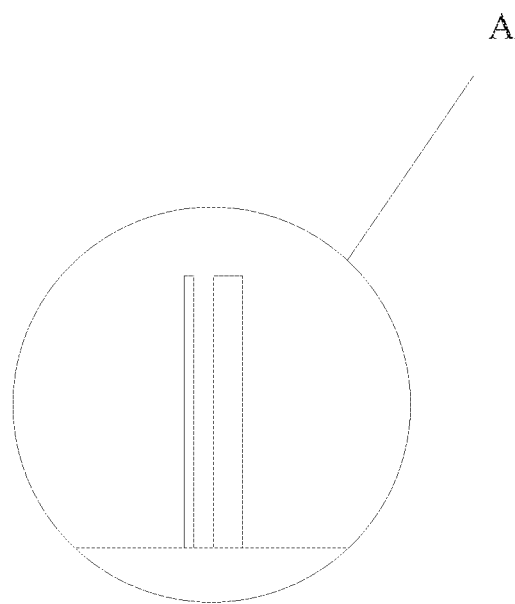
FIG. 4 and FIG. 5 illustrate the schematic enlarged views of two backlight pulses in sequence in FIG. 3 respectively.
Figure 5:
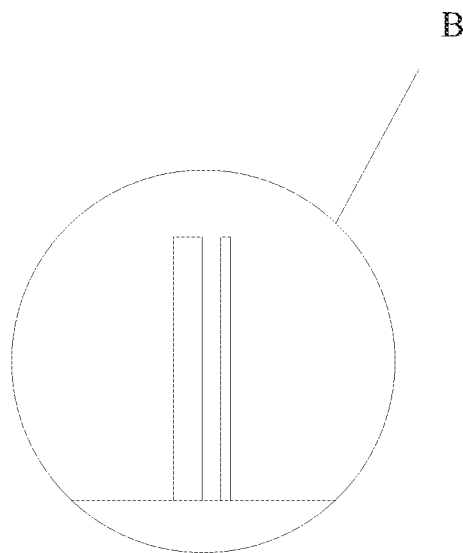

The first backlight pulse and the second backlight pulse could be in any forms that can be differentiated. Preferably, in the present embodiment, the first backlight pulse includes a first pulse and a second pulse emitted in sequence, with the first pulse shorter than the second pulse, as shown in FIG. 4; the second backlight pulse includes a third pulse and a fourth pulse emitted in sequence with the third pulse longer than the fourth pulse, as shown in FIG. 5. Of course, it could also be that the first pulse is longer than the second pulse and the third pulse is shorter than the fourth pulse.

Figure 6:
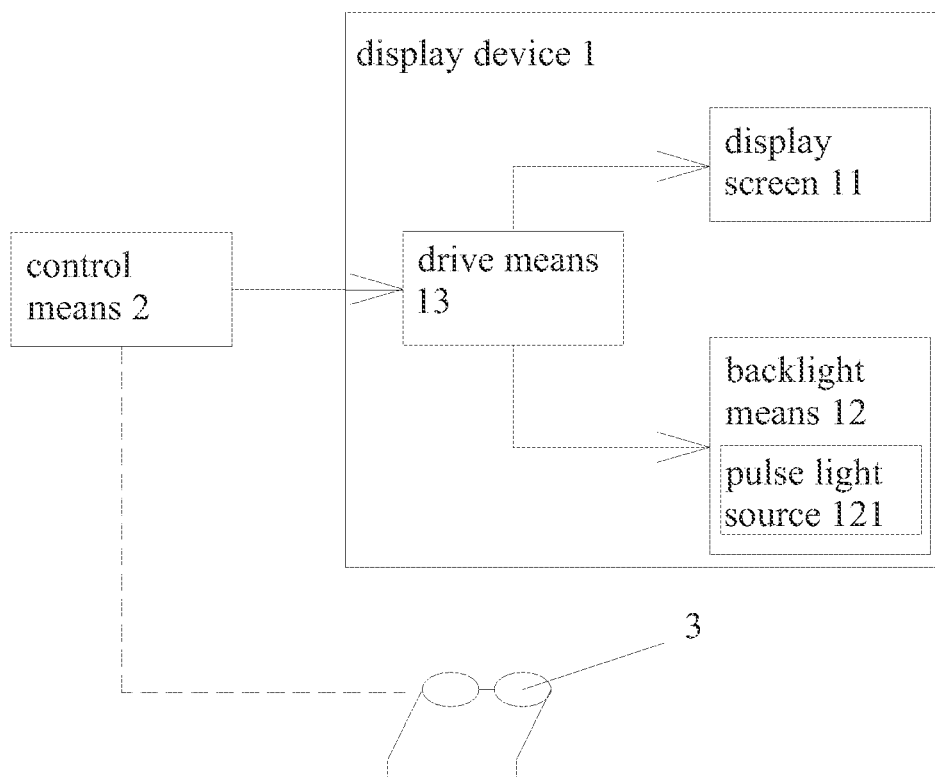
FIG. 6 illustrates a schematic component view of the 3D display system in accordance with the embodiment of the present invention.
Figure 7:
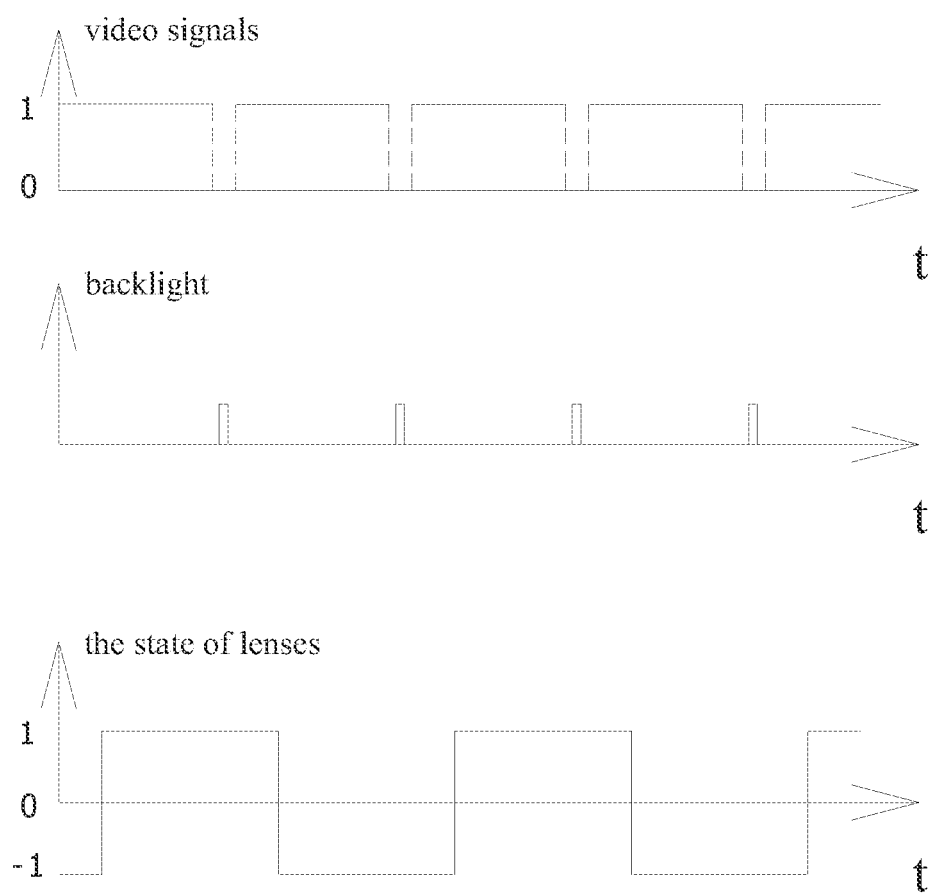
FIG. 7 illustrates a timing diagram of the video signals, the emitted backlight and the state of lenses of the 3D glasses in the 3D display system in accordance with the embodiment of the present invention.

As shown in FIG. 6, the 3D display system according to the embodiment of the present invention comprises a 3D display device 1, a control means 2 and 3D glasses. The 3D display device 1 includes a display screen 11, a backlight means 12 and a drive means 13. The backlight means 12 includes a pulse light source 121. The drive means 13 is connected to the control means 2 to receive video signals based on a standard video transmission protocol and output by the control means 2, so as to control the display screen 11 to display 3D images according to the video signals, and control the pulse light source 121 to emit a backlight pulse in the form of pulse during a vertical blank of each frame period of the video signals, as shown in FIG. 7. Wherein the duration of the backlight pulse is shorter than that of the vertical blank. In addition, the 3D glasses are connected to the control means 2 in a wired or wireless manner, so as to block two lenses thereof alternately in equal block periods according to the above mentioned video signals based on a standard video transmission protocol. Wherein each of the block periods corresponds to each frame period of the video signals, as shown in FIG. 7. In FIG. 7, in the coordinate of video signals, '1' represents that the frame of video signals is being transmitted while '0' represents that the transmission of the frame of video signals is completed, i.e. the vertical blank. In the coordinate of the state of lenses, '0' represents that both of the lenses are blocked, '1' represents that the left lens is pervious to light and '−1' represents that the right lens is pervious to light.

It will be understand by people skilled in the art that since the level of feeling about the image that the eye experiences is the integral of brightness of the image and time of feeling, the power of the above mentioned backlight pulse should be much higher than that of the ordinary continuous backlight.

It will be understand that in the 3D display system, all of the light corresponding to each frame of the video signals from the display device 1 will enter the respective one of the lenses of the viewer's glasses, so that the degrading of light is avoided. Besides, since backlight is the most power consuming source in a display device, and in the 3D display device of the present invention, the backlight means 12 doesn't emit any light during the transmission stage of each frame of video signals, so that the backlight pulse can entirely enter the respective lens of the 3D glasses 3 and there isn't any waste of energy. That is, the efficiency of the emitted backlight can achieve almost 100%.

Besides, the images on the display screen is seen by the viewers only during the pretty short time when the backlight is being emitted, which causes the vertical blank of the video signals can only constitute a pretty small bandwidth of the digital link of the video signals (as shown in FIG. 7), so that the control means 2 outputs (and the drive means 13 receives) video signals which are based on a standard video transmission protocol (the vertical blank of which is pretty short). Thus, the standard drive means can be used, which is beneficial for further update of the drive means and the whole 3D display system.

Furthermore, in the 3D display system of the present invention, the light source in the backlight means 12 is the pulse light source 121 which only emits one backlight pulse corresponding to the vertical blank of each frame of video signals. The display screen 11 doesn't emit light except in the time of the backlight pulse. Thus, it is not necessary for both lenses of the 3D glasses 3 to be blocked during the transmission stage of each frame of image. That is, for the 3D display device 1 of the present invention, it is only required that the two lenses of the 3D glasses 3 are blocked alternately (pervious to light alternately), with each lens experiences one backlight pulse during the period in which it is pervious to light. Thus the demand for the control precision of synchronization of the 3D glasses in the 3D display system of the present invention is decreased.

Furthermore, the peak power of the backlight pulse is preferably greater than 100 W such that normal and clear images are seen by viewers. The peak power of the backlight pulse is more preferably 2 KW or even more than 2 KW.

Preferably, the video signals output by the control means 2 and received by the drive means 13 are based on a standard DVI protocol, or based on a standard HDMI protocol, or based on a standard DP protocol. The vertical blank of each frame period of the video signals based on a standard DVI protocol constitutes 1%-2% of each frame period of the video signals. The vertical blank of each frame period of the video signals based on a HDMI protocol constitutes 1%-2% of each frame period of the video signals. The vertical blank of each frame period of the video signals based on a DP protocol constitutes 1%-2% of each frame period of the video signals.

The pulse light source 121 could be any tight source that can emit light with high power (e.g. an average power of more than 100 W and a peak power of more than 1000 W) and can bear the emission of pulse light. Preferably, the pulse light source 121 could be a pulse-LED, or preferably, the pulse light source 121 could also be a semiconductor laser.

Moreover, preferably, the transmission rate of the above mentioned video signals could be greater than 120 frames/s, so that for the 3D glasses 3, each of the lenses receive images at a rate of more than 60 frames/s, to ensure that the eyes of the viewer(s) won't feel any blinking.

In addition, the backlight pulses could preferably be uniform as mentioned above. Preferably, the backlight pulse has two types, a first backlight pulse and second backlight pulse, which are emitted alternately. The 3D glasses 3 block one of the two lenses thereof according to the finish of the first backlight pulse, and block the other one of the two lenses thereof according to the finish of the second backlight pulse, as shown in FIG. 7. It will be understand that this kind of situation also belongs to the case in which the 3D glasses are indirectly connected wirelessly to the control means 2, since the backlight pulses are also emitted according to the video signals output by the control means. Besides, the first backlight pulse and the second backlight pulse could be in any forms that can be differentiated as mentioned above, which will not be discussed in detail here.

According to yet another aspect of the present invention, a method for displaying 3D images is provided which comprises the following steps:

S101: receiving video signals which are based on a standard video transmission protocol.

S102: displaying 3D images according to the video signals, and emitting a backlight pulse in the form of pulse during a vertical blank of each frame period of the video signal.

Wherein the duration of the backlight pulse is shorter than that of the vertical blank in the S102.

It will be understand that when using this method, all of the light of the image corresponding to each frame of the video signals will enter the lenses of the viewer's glasses, so that the degrading of light is avoided. Besides, there isn't any backlight pulses emitted during the transmission stage of each frame of video signals, so that the backlight pulse can entirely enter the respective lens of the 3D glasses 3 and there isn't any waste of energy. That is, the efficiency of the emitted backlight can achieve almost 100%. In addition, when using the method, the video signals received are based on a standard video transmission protocol, so that the respective 3D display device, system (especially the drive means) could be standard, and beneficial for further update, as is known from the above. Furthermore, since the backlight is in the form of pulses, it is only required that the two lenses of the 3D glasses 3 are blocked alternately (pervious to light alternately), with each lens experiences one backlight pulse during the period in which it is pervious to light. Thus the demand for the control precision of synchronization of the 3D glasses is decreased in this method.

Furthermore, the peak power of the backlight pulse is preferably greater than 100 W such that normal and clear images are seen by viewers. The peak power of the backlight pulse is more preferably 2 KW or even more than 2 KW.

Besides, preferably, the backlight pulses may include first backlight pulse and second backlight pulse, which are emitted alternately, such that the method can be used to control the states of the respective 3D glasses simultaneity.

The present invention has been described through the above-mentioned embodiments. However, it will be understand that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims and equivalent scope thereof.

What is claimed is:

1. A 3D display device, characterized in that said 3D display device comprises:
   a display screen;
   a backlight means including a pulse light source; and
   a drive means used to receive video signals which are based on a standard video transmission protocol, so as to control the display screen to display 3D images according to the video signals, and control the pulse light source to emit a backlight pulse in the form of pulse during a vertical blank of each frame period of the video signals, wherein the duration of the backlight pulse is shorter than that of the vertical blank;
   wherein the backlight pulse has two types, a first backlight pulse and a second backlight pulse, which are emitted alternately and correspond respectively to an image intended for a left eye of a viewer and an image intended for a right eye of the viewer.

2. The 3D display device according to claim 1, characterized in that the peak power of the backlight pulse is greater than 100 W.

3. The 3D display device according to claim 2, characterized in that the peak power of the backlight pulse is 2 KW.

4. The 3D display device according to claim 1, characterized in that
   the video signals are based on a standard DVI protocol, with the vertical blank of each frame period thereof constituting 1%-2% of each frame period; or
   the video signals are based on a standard HDMI protocol, with the vertical blank of each frame period thereof constituting 1%-2% of each frame period; or
   the video signals are based on a standard DP protocol, with the vertical blank of each frame period thereof constituting 1%-2% of each frame period.

5. The 3D display device according to claim 1, characterized in that the pulse light source is a pulse-LED or a semiconductor laser.

6. The 3D display device according to claim 1, characterized in that the transmission rate of the video signals is greater than 120 frames/s.

7. The 3D display device according to claim 1, characterized in that
   the first backlight pulse includes a first pulse and a second pulse emitted in sequence;
   the second backlight pulse includes a third pulse and a fourth pulse emitted in sequence; wherein the first pulse is shorter than the second pulse, and the third pulse is longer than the fourth pulse; or the first pulse is longer than the second pulse, and the third pulse is shorter than the fourth pulse.

8. A 3D display system, characterized in that said 3D display system comprises:
   a control means which outputs video signals based on a standard video transmission protocol;
   a 3D display device which comprises
   a display screen;
   a backlight means including a pulse light source; and
   a drive means connected to the control means to receive the video signals, so as to control the display screen to display 3D images according to the video signals, and control the pulse light source to emit a backlight pulse in the form of pulse during a vertical blank of each frame period of the video signals, wherein the duration of the backlight pulse is shorter than that of the vertical blank; and
   3D glasses which are connected to the control means in a wired or wireless manner, so as to block two lenses thereof alternately in equal block periods according to the video signals, wherein each of the block periods corresponds to each frame period of the video signals;
   wherein the backlight pulse has two types, a first backlight pulse and a second backlight pulse, which are emitted alternately and correspond respectively to an image intended for a left eye of a viewer and an image intended for a right eye of the viewer.

9. The 3D display system according to claim 8, characterized in that the peak power of the backlight pulse is greater than 100 W.

10. The 3D display system according to claim 9, characterized in that the peak power of the backlight pulse is 2 KW.

11. The 3D display system according to claim 8, characterized in that
    the video signals are based on a standard DVI protocol, with the vertical blank of each frame period thereof constituting 1%-2% of each frame period; or
    the video signals are based on a standard HDMI protocol, with the vertical blank of each frame period thereof constituting 1%-2% of each frame period; or
    the video signals are based on a standard DP protocol, with the vertical blank of each frame period thereof constituting 1%-2% of each frame period.

12. The 3D display system according to claim 8, characterized in that the pulse light source is a pulse-LED or a semiconductor laser.

13. The 3D display system according to claim 8, characterized in that the transmission rate of the video signals is greater than 120 frames/s.

14. The 3D display system according to claim 8, characterized in that
    the 3D glasses block one of the two lenses thereof according to the finish of the first backlight pulse, and block the other one of the two lenses thereof according to the finish of the second backlight pulse.

15. The 3D display system according to claim 14, characterized in that
the first backlight pulse includes a first pulse and a second pulse emitted in sequence;
the second backlight pulse includes a third pulse and a fourth pulse emitted in sequence; wherein the first pulse is shorter than the second pulse, and the third pulse is longer than the fourth pulse; or the first pulse is longer than the second pulse, and the third pulse is shorter than the fourth pulse.

16. The 3D display system of claim 8, wherein the system is operable to block two lenses of the 3D glasses alternately without having both of the lenses of the 3D glasses blocked simultaneously.

17. The 3D display device of claim 8, wherein the first backlight pulse and a second backlight pulse are differentiated.

18. The 3D display device of claim 8, wherein each of lenses of the 3D glasses is blocked in accordance with the first backlight pulse and the second backlight pulse, respectively.

19. A method for displaying 3D images, characterized in that said method comprises steps of:
receiving video signals which are based on a standard video transmission protocol;
displaying 3D images according to the video signals, and emitting a backlight pulse in the form of pulse during a vertical blank of each frame period of the video signals, wherein the duration of the backlight pulse is shorter than that of the vertical blank;
wherein the backlight pulse has two types, a first backlight pulse and a second backlight pulse, which are emitted alternately and correspond respectively to an image intended for a left eye of a viewer and an image intended for a right eye of the viewer.

20. The method according to claim 19, characterized in that the peak power of the backlight pulse is greater than 100 W.

21. The method according to claim 20, characterized in that the peak power of the backlight pulse is 2 KW.

\* \* \* \* \*